Jan. 14, 1958  E. H. LAND  2,819,662
PHOTOGRAPHIC APPARATUS EMBODYING PROCESSING MEANS
Filed Oct. 22, 1954  5 Sheets-Sheet 1

INVENTOR
Edwin H. Land

BY Brown and Mikulka
ATTORNEYS

Jan. 14, 1958          E. H. LAND          2,819,662

PHOTOGRAPHIC APPARATUS EMBODYING PROCESSING MEANS

Filed Oct. 22, 1954          5 Sheets-Sheet 2

INVENTOR
Edwin N. Land
BY Brown and Mikulka
ATTORNEYS

Jan. 14, 1958     E. H. LAND     2,819,662
PHOTOGRAPHIC APPARATUS EMBODYING PROCESSING MEANS
Filed Oct. 22, 1954     5 Sheets-Sheet 3

INVENTOR
Edwin H. Land
BY Brown and Mikulka
ATTORNEYS

Jan. 14, 1958   E. H. LAND   2,819,662
PHOTOGRAPHIC APPARATUS EMBODYING PROCESSING MEANS
Filed Oct. 22, 1954   5 Sheets-Sheet 4

INVENTOR
Edwin H. Land
BY Broward M. Kulka
ATTORNEYS

Jan. 14, 1958  E. H. LAND  2,819,662
PHOTOGRAPHIC APPARATUS EMBODYING PROCESSING MEANS
Filed Oct. 22, 1954  5 Sheets-Sheet 5

INVENTOR
Edwin H. Land
BY Brown and Mikulka
ATTORNEYS though # United States Patent Office 2,819,662
Patented Jan. 14, 1958

2,819,662

PHOTOGRAPHIC APPARATUS EMBODYING PROCESSING MEANS

Edwin H. Land, Cambridge, Mass., assignor to Polaroid Corporation, Cambridge, Mass., a corporation of Delaware Application October 22, 1954, Serial No. 463,848

19 Claims. (Cl. 95—13)

This invention relates to photography and, more particularly, to novel photographic apparatus such as a camera wherein a photosensitive element is exposed and processed.

The present invention is concerned with the provision of a simple and inexpensive camera for use with a film unit including a photosensitive element, a second element, and means containing a processing composition. The camera includes means for exposing the photosensitive element to actinic light and predeterminedly processing the photosensitive element by spreading the processing composition in a thin layer between the photosensitive element and the second element. While the second element, for example, may merely aid in spreading the processing composition in a uniform layer on the photosensitive element, in a preferred form of film unit it serves as an image-receptive element or support for a positive print, the latter being formed by diffusion-transfer reversal. In addition to the aforesaid photosensitive and second elements, the film unit includes an opaque outer cover element for preventing exposure of the photosensitive element to environmental light.

It is one object of the present invention to provide a camera including a housing, a passage therein adapted to receive a film unit of the above type, and means rendered operative during insertion and withdrawal of the film unit through said passage to expose and process the photosensitive element.

Another object of the present invention is to provide, in a camera of the above type, means for spreading a processing composition between the photosensitive element and the second element of a film unit during insertion of said film unit through said passage into said camera housing.

A further object of the present invention is to provide, in a camera of the above type, means responsive to the movement of said film unit through said passage into exposure position for exposing said photosensitive element when the latter is in said exposure position.

Still further objects of the present invention are to provide, in a camera of the above type: delay means actuated during movement of said film unit through said passage into said exposure position for delaying exposure of said photosensitive element until movement thereof has stopped and said photosensitive element is at rest in said exposure position; means associated with said passage for separating said opaque cover element from said photosensitive element during insertion of said film unit into said camera housing; and separating means of the above type capable of reapplying said cover element to said photosensitive element in a lighttight fashion during withdrawal of said film unit through said passage.

Still another object of the present invention is to provide a camera of the above type capable of functioning as a means for viewing and/or projecting a positive image formed on a transparent image-receptive element of a film unit in said camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Generally, the present invention contemplates the provision of a novel, inexpensive, compact box-type camera capable of making a single exposure of the photosensitive element of a film unit when the latter is inserted into the camera through a passage, and of processing the film unit to form a finished photographic print, preferably a positive transparency. The camera is relatively small, being, preferably, only sufficiently large to produce a transparency, for example, of 35 mm. size, and is simple in its operation, requiring only that the operator insert a film unit into a passage in the camera housing until it comes to rest in exposure position and then withdrawing the film unit from the housing following exposure. The film unit includes a photosensitive element, a second or image-receptive element and means containing a liquid processing composition. In the preferred form of the camera, as the film unit is moved through the passage into exposure position, the processing liquid is so spread from the containing means in a thin layer as to permeate the photosensitive and image-receptive elements. Means, preferably responsive to the movement of a film unit, are provided for exposing the photosensitive element immediately as it comes to rest in exposure position, and, upon exposure, the processing liquid develops the latent image in the photosensitive element and forms a print of the image on the image-receptive element. Following exposure of the photosensitive element, the film unit may be withdrawn from the camera at once, or at the end of a predetermined processing period. After withdrawal from the camera, the photosensitive and second elements are stripped apart. The herein disclosed camera is further adapted, without modification, for immediate use as a viewer for positive transparencies produced thereby, or may be coupled with a suitable light source to provide a satisfactory projector for the same transparencies.

Figures 1, 2, 3:
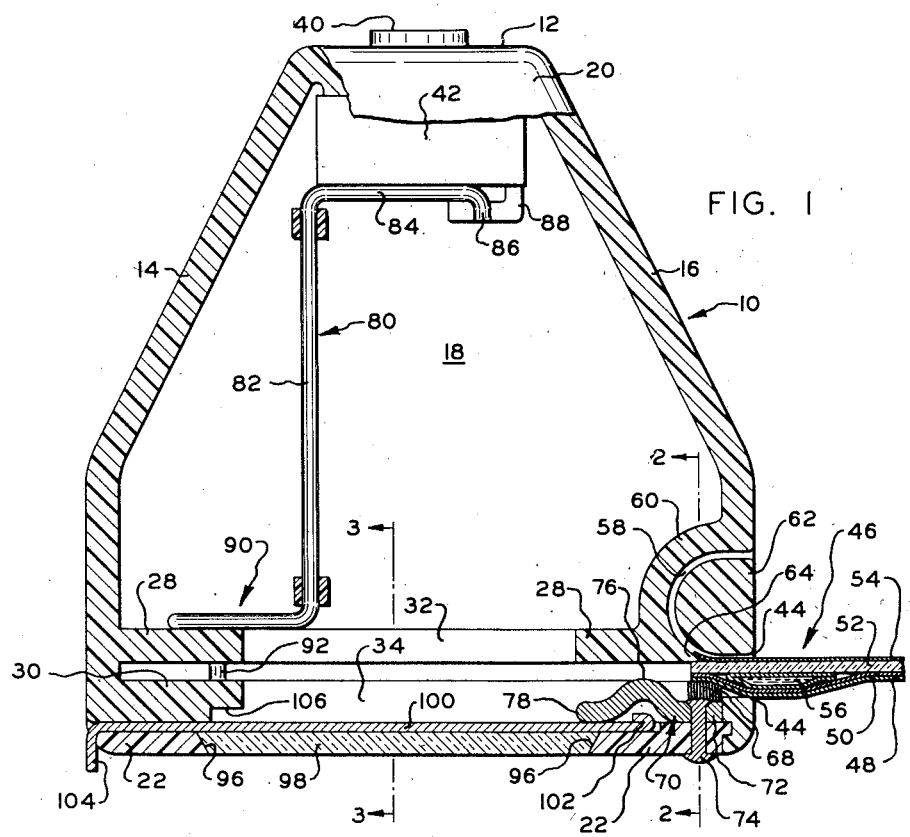
Figure 1 is an enlarged plan view, with parts broken away and partially in section, of a camera embodying the present invention, illustrated together with an embodiment of a film unit, also in section, adapted for use with the camera.
Fig. 2 is a sectional view taken substantially along the line 2—2 of Fig. 1.
Fig. 3 is a sectional view taken substantially along the line 3—3 of Fig. 1.

Referring now to Figs. 1 through 3 of the drawings, there is shown a preferred form of camera embodying the present invention, together with a film unit adapted for use with the camera. For purposes of illustration, the camera and film unit are shown as somewhat enlarged and the thickness of the materials comprising the film unit greatly exaggerated for clarity. The camera comprises a generally rectangular housing 10 including a relatively short front wall 12, two side walls 14 and 16, having rear portions parallel to each other and substantially perpendicular to front wall 12 and front portions which are convergent, a bottom wall 18, and a top wall 20, the greater portion of which is illustrated as broken away in order to show the other components of the camera. Housing 10 includes a rear wall 22, preferably removable from the housing to provide for access to the interior of said housing and, so that it may be secured to housing 10 in a lighttight fashion, rear wall 22 is provided with dependent angular flanges 24 adapted to engage corresponding shoulders 26 on the rear portions of side wall 14, bottom wall 18 and top wall 20.

Means are provided for guiding a film unit into position for exposure and, in the form shown, comprise a pair of parallel intermediate guide walls 28 and 30 predeterminedly spaced apart to permit movement of a film unit between their adjacent surfaces. Guide wall 30 is positioned adjacent the rear of housing 10, and wall 28 is positioned forwardly of wall 30. Wall 28 is provided with a rectangular exposure aperture, designated at 32, through which actinic light may be transmitted to a film unit positioned for exposure between guide walls 28 and 30. Guide wall 30 includes a rectangular aperture 34 generally corresponding to aperture 32 in wall 28 but having only one side portion adjacent side wall 14 and top and bottom longitudinal marginal portions 38 which extend to side wall 16 to provide means for guiding a film unit into exposure position. Side wall 16 of the camera housing is provided with an opening associated with guide walls 28 and 30 and forming, in conjunction therewith, a passage, indicated at 44, through which a film unit 46 may be moved into position for exposure within housing 10.

For exposing the photosensitive element of a film unit positioned between guide walls 28 and 30, there are provided means, such as a lens 40 and shutter mechanism 42, mounted on front wall 12. Lens 40, for example, may be of a fixed focus or of a conventional design including manually operable control means for varying its focus and shutter mechanism 42 is of any suitable conventional design and may include, for example, means (not shown) permitting manual operation as well as adjustment of exposure speed. The camera may also include a view finder mounted on the exterior of the housing, for example, on upper wall 20.

Film unit 46 is illustrated in Fig. 1 with its end portion inserted into passage 44 in position to be moved through the passage into exposure position and is preferably a substantially rigid or inflexible, multilayer assemblage comprising an outer lighttight envelope including an opaque rear cover sheet 48 and a front cover sheet 54 composed, for example, of a flexible opaque paper, a photosensitive element 50, a second or image-receptive element 52, and a rupturable container 56 carrying a liquid composition capable of processing the photosensitive element. To render the edges of the film unit lighttight, rear cover sheet 48 may include longitudinal edge portions extending around the edges of the film unit and joining with front cover sheet 54. Front cover sheet 54 is adapted to be stripped from the film unit within the lighttight environment of the camera housing during movement into exposure position and for this purpose is adhered, at its longitudinal edge portions, to second element 52 by some suitable material which is readily strippable or, in a preferred form, by a pressure-sensitive adhesive permitting sheet 54 to be readhered to the film unit in a lighttight fashion during withdrawal from the camera.

Photosensitive element 50 of film unit 46 includes a layer of photosensitive material, preferably an emulsion of silver halide, in which a latent image may be obtained by differential exposure to actinic light cast on a suitable support or backing. Second element 52, superposed with photosensitive element 50, is adapted to serve as a support for an image-receptive layer in which a visible print of a latent image in the photosensitive layer may be produced. Rupturable container 56, carrying a processing liquid, is mounted adjacent one end of the film unit between the photosensitive and image-receptive elements, and the photosensitive element is adapted to be processed by advancing the film unit between a pair of pressure-applying members in order to rupture container 56 and spread the processing composition between photosensitive and image-receptive layers of elements 50 and 52. An alternative construction of the film unit, disclosed in Patent No. 2,661,293, issued December 1, 1953, to Edwin H. Land, for Process of Producing a Colored Photographic Image by Means of Exhaustion of Developer, comprises an image-receptive layer on a support and a photosensitive layer on the image-receptive layer. In this form of film unit, a separate photosensitive element is unnecessary and a container for the processing liquid is mounted between cover sheet 48 and support element 52 in position to discharge its liquid contents on the surface of the photosensitive layer adjacent cover sheet 48, the latter being formed of an opaque liquid-impermeable material.

The herein disclosed camera is particularly adapted for use with photographic film assemblages of the type disclosed in my copending application Serial No. 265,413, filed January 8, 1952, now Patent No. 2,726,154, entitled Photographic Product, and including a transparent support having on one side thereof a photosensitive silver halide layer and an image-receptive layer for a photographic transfer image and having on the opposite side thereof a multiplicity of lenticulations or a gridlike arrangement of a multiplicity of filter elements comprising a color screen.

In the form of film unit shown in Fig. 1, photosensitive element 50 is adapted to be exposed through image-receptive element 52, making it essential that at least the portion of element 52 overlying the area of the photosensitive element to be exposed is transparent, while photosensitive element 50 and the margins of element 52 are preferably opaque to aid in rendering the film unit lighttight at its edges. It is important that the film unit have sufficient structural strength and rigidity to permit its being manually inserted into passage 44 and, during movement into exposure position, to pass between pressure-applying means for spreading the processing liquid and to engage and render operative means for making an exposure. These features, together with the provision of an attractive inflexible mount for a positive photographic print, preferably a transparency, may be realized by casting the image-receptive layer of element 52 on a suitable inflexible transparent material substantially thicker than the other elements comprising the unit, glass and transparent organic plastic material being suitable for this purpose.

The processing composition, which spread in a uniformly thin layer between elements 50 and 52, preferably effectuates a silver halide, diffusion-transfer reversal process by which a latent image in element 50 is developed and a positive print is produced in element 52. Examples of photographic materials useful in processes of the foregoing type are described in detail in Patent No. 2,543,181, issued to Edwin H. Land on February 27, 1951, for Photographic Product Comprising a Rupturable Container Carrying a Photographic Processing Liquid and in Patent No. 2,647,056, issued to Edwin H. Land on July 28, 1953, for One-Step Photographic Transfer Process.

In another form of film unit, element 50 may comprise a liquid-permeable material and container 56 carries a photosensitizing composition as well as a developer. In this form of film unit, element 50 may be impregnated with an alkali and a silver halide solvent such as sodium thiosulfate and the liquid contents of the container include a photosensitizing composition such as a photosensitive silver halide emulsion suitable for coating onto element 50, and a developer. Alternatively, the developer may be carried by element 50 and the container charged with the alkali and the silver halide emulsion. As a further alternative, a developer not requiring the presence of an alkali may be impregnated into element 50 and the container carries the photosensitive silver halide emulsion. It becomes apparent that this construction of the film unit obviates the necessity for cover sheets 48 and 54, since the photosensitive silver halide emulsion is carried in a lighttight container and may be spread from the container in the lighttight environment of the camera housing. The film unit may also include two containers, one carrying a processing composition for effectuating a silver halide diffusion-transfer reversal process and the second container carrying a composition intended, for example, to hypersensitize or to optically sensitize photosensitive coatings and which is able to effectively perform its function for only a short period. Compositions of this type adapted to be spread upon the element, to be photoexposed, immediately prior to exposure, may be spread together with the composition for processing the photoexposed element and are more fully described in my co-pending application Serial No. 299,358, filed July 17, 1952, entitled Photographic Product and Process.

It is understood that the processing composition need not effectuate a diffusion-transfer reversal process but may act merely to develop the latent image in element 50 or a latent image in element 52 when the latter is provided with a stratum of photosensitive material. In this case, the nonphotosensitive element acts merely to spread the composition upon the photosensitive element. Where element 52 is photosensitive, element 50 may be omitted if cover sheet 48 itself is effective to spread the composition upon element 52. While the film unit has been described as comprising materials capable of effecting a silver halide diffusion-transfer reversal process, the film unit may also include photosensitive ferric compounds with a processing composition which includes suitable couplers, diazonium compounds, which decompose when photoexposed, together with suitable developers which include couplers capable of forming dyes, or materials capable of becoming differentially insolubilized or tanned when photoexposed.

Means are provided for separating or stripping front cover sheet 54 from film unit 46 as the latter moves through passage 44 in order to permit exposure of the photosensitive element within the camera housing. This stripping means includes a narrow curved passage 58 which leads from passage 44 to the exterior of housing 10 and is defined by curved portion 60 of wall 28 and another member 62 having an inner curved surface which is substantially parallel to the outer surface of wall portion 60. Wall portion 60 and member 62 extend between the top and bottom walls of the camera housing to form passage 58 between their adjacent surfaces, the passage being only sufficiently wide to permit the free movement of cover sheet 54 therethrough. The passage is curved so as to guide cover sheet 54 exteriorly of wall 16 of the housing as it is stripped from element 52, and to prevent the admission of light into the housing. To initially separate the leading end of sheet 54 from element 52 and guide the sheet through passage 58, wall portion 60 includes a wedge-shaped end portion 64 so positioned as to extend into the path of sheet 54 between said sheet and element 52. By virtue of the foregoing arrangement, cover sheet 54, in addition to being stripped from element 52 as film unit 46 is moved through passage 44 into exposure position, may be readhered to element 52 in a lighttight fashion as the film unit is withdrawn from the camera housing following exposure and before processing is complete. To facilitate this readherence, cover sheet 54, as heretofore mentioned, may be secured at its margins to element 52 by pressure-sensitive adhesive and the portions of the surface of wall portion 60 underlying the margins of cover sheet 54 as it moves through passage 58 may be recessed so as not to contact the adhesive on said margins. In another form of film unit, cover sheet 54 may be provided with a leader of sufficient length to extend through passage 58 to the exterior of housing 10 where it may be manually grasped by the operator in order to simultaneously move the film unit through passage 44 into exposure position and to strip sheet 54 from the film unit. To prevent light from leaking into the camera housing around the lateral edges of film unit 46 as it is moved through passage 44 and cover sheet 54 is stripped from element 52, passage 44 is provided with light-shielding means, such as felt pads 68, secured to bottom wall 18 and top wall 20 adjacent the open end of passage 44, these pads being adapted to engage the edges of the film unit as it moves through the passage.

Means are provided within housing 10 adjacent passage 44 for spreading the processing liquid from container 56 between elements 50 and 52 as film unit 46 is advanced through the passage into exposure position. This spreading means comprises a pressure-applying element 70 extending at least from top to bottom of exposure aperture 32 and so positioned that a portion of said element is interposed in the path of the film unit as the latter moves through passage 44. Pressure element 70 includes an end portion 72 at which it is secured to rear wall 22 by suitable means such as rivets 74 and intermediate engagement portion 76 curved away from rear wall 22 into the path of the film unit 46, the other end portion 78 being free. Pressure element 70 is formed of a resilient material, preferably a metallic material such as spring steel, Phosphor bronze or beryllium copper. Engagement portion 76 of pressure element 70 engages film unit 46 and compresses the latter as it is advanced between element 70 and guide wall 28 in order to effect the spreading of the processing liquid from container 56 in a thin layer between photosensitive element 50 and image-receptive element 52.

Figure 5:
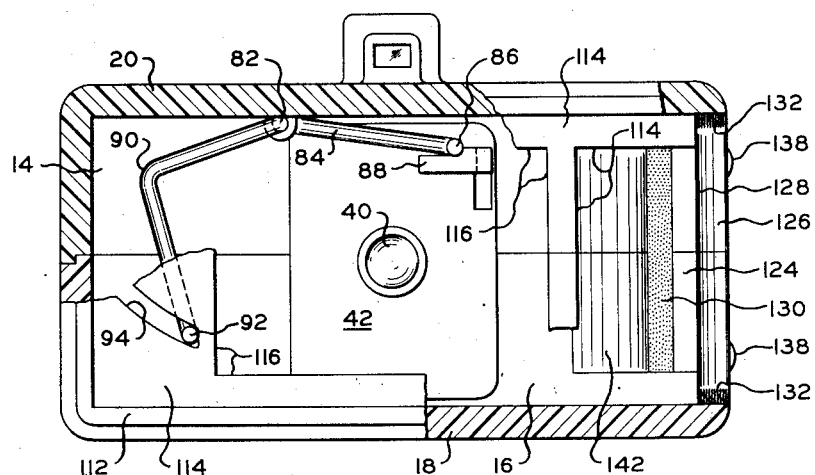
Fig. 5 is a rear elevational view, partially in section and with parts broken away, of the camera of Fig. 4.
Figure 6:
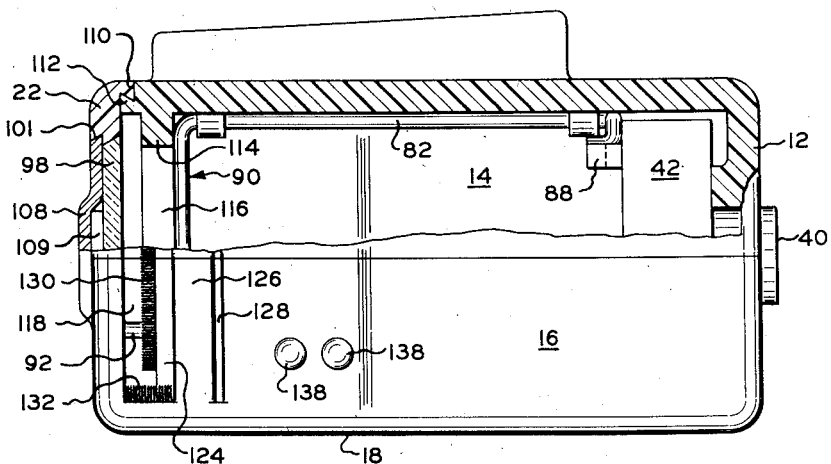
Fig. 6 is a side elevational view, partially in section and with parts broken away, of the camera of Fig. 4.

The spreading of the processing liquid during insertion of the film unit into the camera makes it desirable that the photosensitive element be exposed as soon as the film unit is in exposure position before processing of the photosensitive element has progressed to any appreciable extent. This immediate exposure is best effected by means responsive to the movement of the film unit into exposure position for automatically making the exposure after the film unit has come to rest in this position. These means include exposure means such as a shutter 42 and actuating means comprising an elongated arm 80 adapted to engage film unit 46 for rendering said shutter operative to expose the film unit. Arm 80, formed preferably of a rigid, round wire of sufficient diameter to resist the strain of torsional forces to which it is subjected, includes an elongated relatively straight central portion 82 at which it is secured for pivotal movement about its axis to, or adjacent, upper wall 20 of housing 10 with central portion 82 extending substantially from guide wall 28 to the housing of shutter 42 and perpendicular to guide wall 28. As shown in Figs. 5 and 6, arm 80 includes a first dependent end portion 84 adjacent shutter 42 extending at right angles from central portion 82 and having a substantially short dependent engagement portion 86 at its end adapted to engage an actuating lever 88 comprising shutter 42. The other end of arm 80 comprises a portion 90 extending at a right angle from central portion 82 in a plane parallel to and adjacent guide wall 28. Portion 90 is bent at a right angle and includes a dependent engagement portion 92 extending parallel to central portion 82 into the passage between guide walls 28 and 30.

Arm 80 is so formed and mounted in housing 10 that when said arm is in inoperative position prior to engagement with and actuation by the film unit, end portion 84 lies substantially adjacent upper wall 20, end portion 90 extends angularly downward toward bottom wall 18, and engagement portion 92 projects through an elongated slot 94 in guide wall 28 at a point adjacent the end of exposure aperture 32. Slot 94 is curved upward toward upper wall 20, the center of curvature of said slot being the axis of central portion 82, thereby permitting engagement portion 92 to move in said slot when arm 80 is pivoted about the aforementioned axis. As film unit 46 is moved between guide walls 28 and 30 toward side wall 14, the edge of said film unit engages engagement portion 92 of arm 80, pivoting the latter clockwise (as viewed in Fig. 5) until end portion 90, formed with a right angle bend, is brought to rest against side wall 14 and top wall 20. By virtue of the foregoing arrangement, the force exerted on the film unit in moving it toward wall 14 into exposure position is transmitted through arm 80, including end portion 84 and engagement portion 86, to actuating lever 88, causing the latter to move downward and actuate the shutter to expose the photosensitive element of the film unit.

While movement of the film unit into exposure position is effective to actuate the shutter for making an exposure, it is desirable that the exposure be delayed until this movement has completely ceased and the film unit is at rest in exposure position. This may be accomplished by providing a delay mechanism, actuated by movement of the film unit, operable to actuate the shutter following a predetermined time interval during which movement of the film unit into exposure position is completed. Both the shutter and the delay mechanism may be energized or cocked by movement of actuating lever 88, the latter portion of said movement setting in motion the delay mechanism which in turn trips or releases the shutter at some predetermined interval thereafter. Although movement of the film unit into exposure position is done manually, thereby making accurate control of the rate of said movement uncertain, it has been found that, for all practical purposes, a delay in the order of from 1/5 to 4/5 of a second is adequate to assure cessation of movement of the film unit before the exposure is made. Suitable delay mechanisms such as an escapement device, for example a star wheel and pallet, or an inertia delay element are embodied in many conventional shutters and are well known in the art. Resilient means, preferably incorporated into the shutter mechanism, are provided for returning arm 80 to its initial position prior to exposure after removal of film unit 46 from the camera.

In order to adapt the herein disclosed camera to use as a viewer or projector, rear wall 22 is provided with means permitting illumination of a positive photographic transparency inserted through passage 44 into position between guide walls 28 and 30. In the form shown, this means comprises an aperture 96 in rear wall 22 corresponding to exposure aperture 32 in guide wall 28 and a suitable light-diffusing element 98, such as ground glass or translucent plastic material, closing aperture 96. As a means for rendering the camera housing lighttight during exposure of a film unit, aperture 96 is provided with a lighttight closure element such as a slide 100 removable from its position covering aperture 96 to permit the camera to be used as a viewer (the operator looking through the lens) or as a projector by providing a strong source of illumination behind element 98. Slide 100 is generally flat and rectangular and is slidably mounted in a channeled recess in rear wall 22 between said wall and guide wall 30. In order to retain slide 100 in closure position, said slide includes an overturned end portion 102 which normally underlies engagement portion 76 of pressure element 70, free end 78 of said element bearing on slide 100. The other end of slide 100 extends exteriorly of the camera housing and is turned down to provide a tab 104 which may be manually grasped for drawing the slide toward wall 14 out of closure position. When this is done, pressure element 70 is deflected by end 102 of slide 100, releasing the latter for movement until end 102 is engaged in a recess 106 in guide wall 30, thus preventing the slide from being entirely withdrawn from the camera. To close aperture 96, slide 100 is moved toward wall 16 until end 102 engages and deflects pressure element 70 and moves into position underlying said element where it is retained by said element.

To operate the camera, film unit 46 is inserted into passage 44 so that wedge portion 64 engages cover sheet 54, stripping the latter from image-receptive element 52 and guiding it through passage 58 as the film unit is advanced through passage 44 into exposure position between guide walls 28 and 30 by manual application of pressure on the film unit itself or by drawing cover sheet 54, or a suitable leader attached thereto, as it extends through passage 58 exteriorly of the camera. As the film unit is moved between spreader 70 and guide wall 28, container 56 is ruptured and its liquid contents are spread in a thin layer between photosensitive element 50 and image-receptive element 52. The leading edge of the film unit then engages portion 92 of arm 80, pivoting the latter and thereby actuating the delay mechanism which in turn operates the shutter after movement of the film unit has ceased. Following exposure, the film unit may be permitted to remain in the camera for a predetermined processing period and then removed from the camera and the photosensitive and image-receptive elements stripped apart; or, if it is desired to make several exposures in rapid succession, the film unit may be removed from the camera immediately following exposure, front cover sheet 54 being readhered to image-receptive element 52 in a lighttight fashion during withdrawal of the film unit from the camera, and then, after a predetermined processing period has elapsed, the photosensitive and image-receptive elements may be stripped apart. The transparent image-receptive element supporting a positive image may then be viewed by inserting it into the camera housing in the same manner as the film unit is inserted for exposure. Slide 100 covering diffusing element 98 is withdrawn and, for this purpose, the shutter is provided with suitable means for holding it open to permit the operator to either view the transparency through the camera lens or to use the camera as a projector by providing a strong source of illumination behind the diffusing element.

Figure 4:
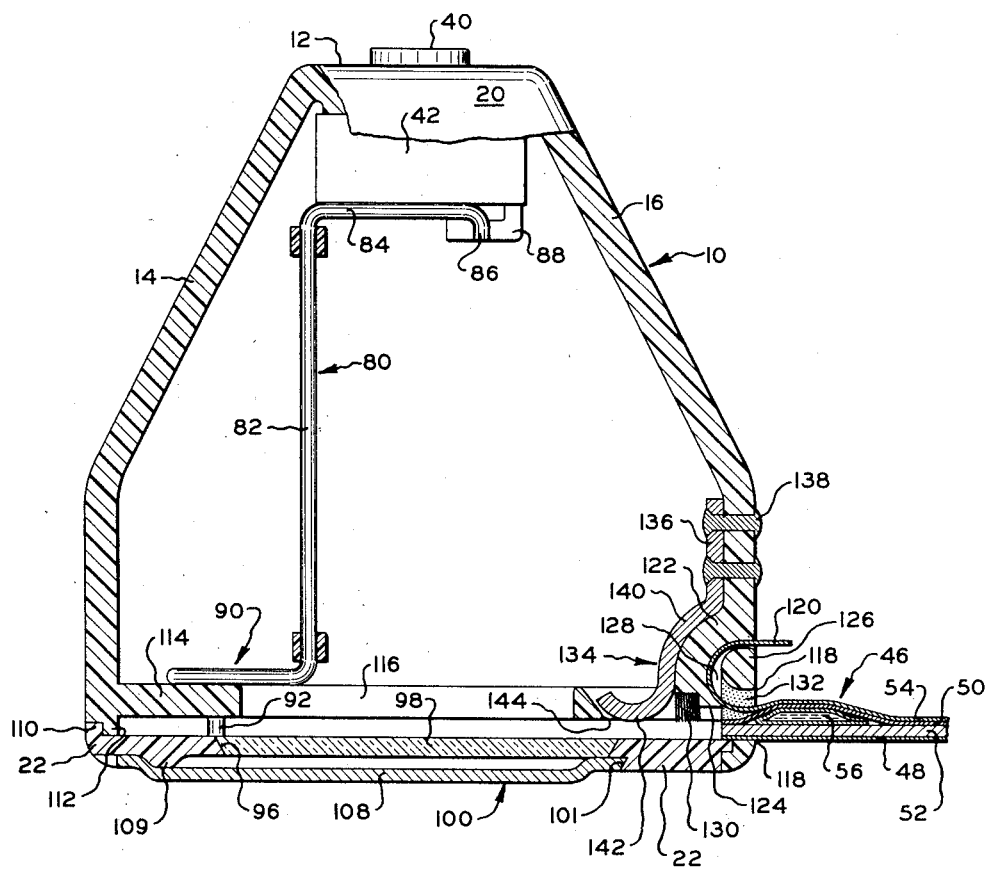
Fig. 4 is an enlarged view, with parts broken away and partially in section, of another camera embodying the present invention, illustrated together with another embodiment of a film unit, also in section, adapted for use with the camera.

Reference is now made to Figs. 4, 5 and 6 wherein there is shown another camera embodying the present invention, like numerals being used to denote parts corresponding to those of the camera of Fig. 1. The camera comprises a housing 10 including a front wall 12, partially convergent side walls 14 and 16, bottom wall 18, top wall 20 and rear wall 22 with a lens 40 and shutter mechanism 42 mounted on front wall 12. Rear wall 22 is retained on the housing in a lighttight fashion by angular flanges 110 on said wall adapted to engage corresponding flanges 112 on the rear portion of side wall 14 and top and bottom walls 18 and 20. By virtue of this arrangement, rear wall 22 is rendered removable by sliding it toward side wall 14 between flanges 112 on top and bottom walls 18 and 20. A film unit 46 may be guided into and retained in position for exposure against rear wall 22 by an intermediate guide wall 114 positioned forwardly of said wall, parallel thereto and spaced a predetermined distance therefrom. Guide wall 114 extends from bottom wall 18 to top wall 20 and is provided with a rectangular exposure aperture 116 through which a film unit positioned between walls 22 and 114 may be exposed.

Side wall 16 is provided with a passage 118 through which a film unit 46 may be moved into exposure position for exposure within housing 10 between rear wall 22 and guide wall 114. Film unit 46, illustrated with its end portion inserted into passage 118 in position to be moved through the passage into exposure position, is substantially the same as the film unit illustrated in Fig. 1 and described heretofore. This film unit comprises a rear cover sheet 48, an image-receptive element 52, a photosensitive element 50, a front cover sheet 54 and a container 56 holding a processing liquid. The film unit is inserted into passage 118 with photosensitive sheet 50 toward the front of the camera, thus obviating the necessity for a transparent image-receptive element through which the photosensitive element must be exposed. In addition, in this form of film unit, front cover sheet 54 may be provided with an elongated leader 120 for purposes to be described more fully hereinafter.

As a means for stripping front cover sheet 54 from photosensitive element 50, side wall 16 includes a concave curved portion 122, adjacent passage 118, having a wedge-shaped end portion 124. Passage 118 is somewhat wider than the thickest portion of film unit 46 with end portion 124 extending into this passage, the space between said end portion and rear wall 22 being only sufficient to admit the thickest portion of the film unit without cover sheet 54. There is provided a member 126 having an inner rounded surface generally parallel to the outer concave curved surface of wall portion 122 and defining, in conjunction with said wall portion, a curved passage 128 communicating with the exterior of side wall 16 of housing 10. Wedge portion 124 is adapted to separate front cover sheet 54 from photosensitive element 50 and guide the cover sheet through passage 128 to the exterior of the housing as film unit 46 is moved into exposure position. In operation, leader 120 is inserted through passage 118 into engagement with wedge portion 124 and then through passage 128 to the exterior of the housing. The free end of leader 120 extending through passage 128 may then be grasped by the operator for drawing the film unit into the camera and at the same time stripping cover sheet 54 from the film unit. To prevent light from entering the camera during movement of film unit 46 through passage 118 and stripping of cover sheet 54 from said film unit, wall portion 122 is provided with shielding means such as a felt pad 130 secured to said wall portion adjacent wedge portion 124 and extending into the path of the film unit. Additional felt pads 132 are secured to bottom wall 18 and top wall 20 in passage 118, these pads engaging the lateral edges of the film unit as it moves through the passage.

As a means for spreading the processing liquid between photosensitive element 50 and image-receptive element 52 during movement of film unit 46 through passage 118, there is provided a pressure-applying element 134 comprising a generally flat end portion 136 at which element 134 is secured to side wall 16 by suitable means such as rivets 138, an intermediate portion 140 curved to conform to wall portion 122, and an arcuately curved end portion 142 extending through the aperture 144 in guide wall 114 into the path of the film unit. End portion 142 of pressure element 134 is normally so spaced from rear wall 122 that the film unit is compressed as it moves between said wall and end portion 142 of pressure element 134, thereby effecting the spreading of the processing liquid.

Rear wall 22 is provided with means permitting illumination of a positive transparency inserted through passage 118 into exposure position so that the camera may be readily adapted to use as a viewer and, in the form shown, this means comprises an aperture 96 in rear wall 22 corresponding to exposure aperture 116 in guide wall 114, a light-diffusing element 98 secured in aperture 96 and a slide plate 100 for closing said aperture to actinic light during exposure of a film unit in the camera. Slide plate 100 is generally flat and rectangular, being mounted in a channeled recess having inwardly divergent sides 101 in rear wall 22, sides 101 retaining said plate in closure position overlying diffusing element 98 but permitting plate 100 to be moved toward wall 14 out of closure position. Plate 100 includes a longitudinal dished or recessed section 108 adapted to clear a raised boss 109 on rear wall 22 adjacent end wall 14. Recessed section 108 does not extend completely from end to end of slide plate 100 and the marginal portions of the ends of plate 100 will not clear raised boss 109. It is by virtue of this arrangement that plate 100 is prevented from being completely separated from the camera since it cannot be entirely withdrawn from the channeled recess in rear wall 22 in which it is retained.

Figure 7:
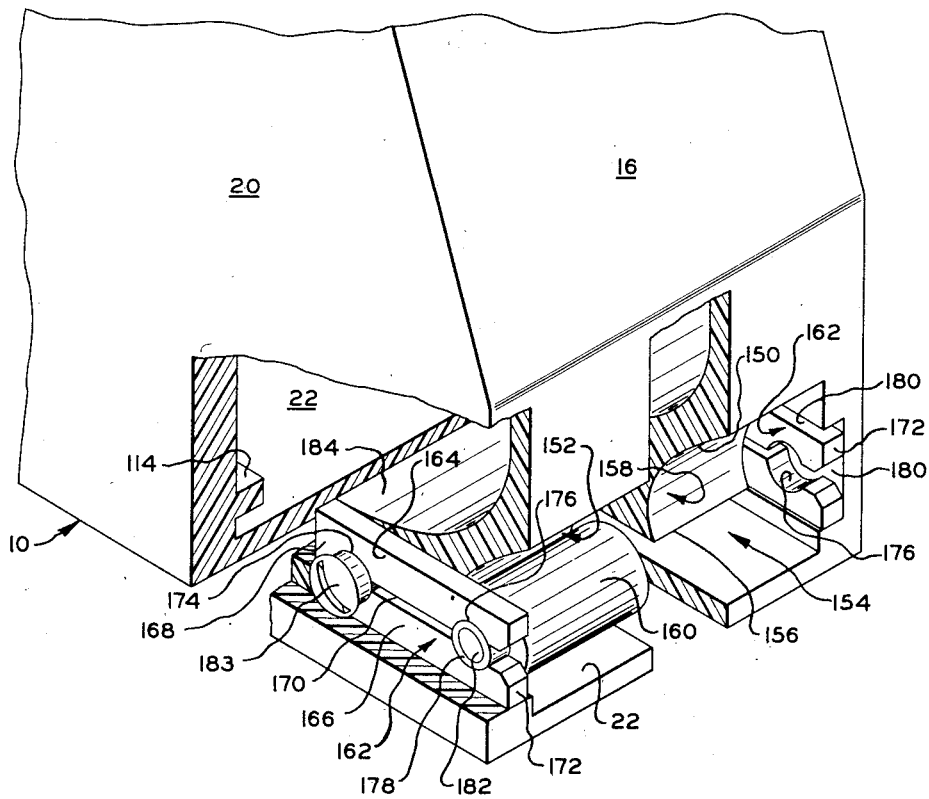
Fig. 7 is a perspective view of another camera embodying the invention with parts broken away to show the spreading means.

Referring now to Fig. 7, there is shown still another form of camera embodying the present invention wherein the processing liquid is spread on the photosensitive element prior to stripping of the front cover sheet from the film unit and the liquid-spreading means includes a pressure roller and means for mounting said roller and urging it into pressure contact with a film unit as the latter is moved into exposure position. In Fig. 7, like numbers refer to like elements in the other figures, the camera including a housing indicated at 10 having a side wall 16, top wall 20, etc. In this form of the invention, side wall 16 includes a rectangular curved recessed portion 150 defining a recess 152 and an elongated passage 154 in said recess sufficiently wide, from front to rear, to receive a film unit from which the cover sheet has been stripped. To strip the cover sheet from the film unit as the latter moves through passage 154, curved portion 150 of wall 16 includes a wedge-shaped edge portion 156 defining the forward edge of passage 154. Edge portion 156 is so positioned with respect to rear wall 22 defining the rear portion of passage 154 as to extend into the path of the cover sheet between said sheet and the other elements of the film unit and separate the cover sheet therefrom. Curved recessed portion 150 includes a rounded exterior surface 158 for guiding the cover sheet out of the camera as said sheet is separated from the film unit.

The spreading means comprises an elongated pressure-applying roller 160 mounted for pivotal movement in recess 152 forwardly of passage 154 with its axis substantially parallel to rear wall 22 and extending from side to side of said passage. Resilient means are provided for pivotally mounting roller 160, said means comprising a pair of generally flat, rectangular plates 162 formed of a resilient material. Each plate 162 includes a first longitudinal portion 164 and a second longitudinal portion 166 joined together at one end 168 of plate 162 and separated from one another by an elongated slot 170 extending from a point adjacent said end 168 to the other end 172 of said plate. The end of slot 170 adjacent end 168 of plate 162 comprises a rounded opening 174 the diameter of which is greater than the width of said slot, the latter also comprising a second rounded opening 176 adjacent the other end 172 of plate 162, opening 176 being adapted to receive and retain a bushing 178. Plates 162 are mounted in recesses 180 in bottom wall 18 and top wall 20 adjacent the ends of passage 154 perpendicular to rear wall 22 with second longitudinal portion 166 of each plate positioned adjacent rear wall 22. Roller 160 includes a pair of stub shafts 182 at its ends journaled in bushings 178 retained in plates 162, the latter being so mounted that a longitudinal portion of roller 160 extends into the path of a film unit advanced through passage 154. To retain plates 162 in this position, there are provided means such as a pair of screws 183 extending through bottom and top walls 18 and 20, opening 174 in each plate and into an enlarged portion 184 of side wall 16 underlying recessed portion 150. Recesses 180 in which plates 162 are secured are so formed as to permit deflection or movement of first portion 164 of each plate with respect to second portion 166 of said plate in a direction away from rear wall 22 and it is by virtue of this arrangement and the resiliency of said plates that first portion 164 functions as a cantilever spring which causes pressure to be exerted by roller 160 on a film unit as the latter is advanced through passage 154.

The curvature of surface 158 of recessed portion 150 conforms substantially to the surface of roller 160, the latter being so spaced from surface 158 as to define a curved passage just wide enough to permit the cover sheet to move therethrough. By virtue of this arrangement, exposure of the photosensitive element is prevented during stripping of the cover sheet from the film unit. In addition, surface 158 may be recessed adjacent the ends of roller 160 so that the pressure-sensitive adhesive on the margins of a cover sheet adapted to be readhered to the film unit during its withdrawal from the camera will not contact and adhere to said surface. Pressure roller 160, it will be noted, is particularly adapted for reapplying the cover sheet to a film unit as the latter is withdrawn through passage 154 following exposure in the camera.

Figure 8:
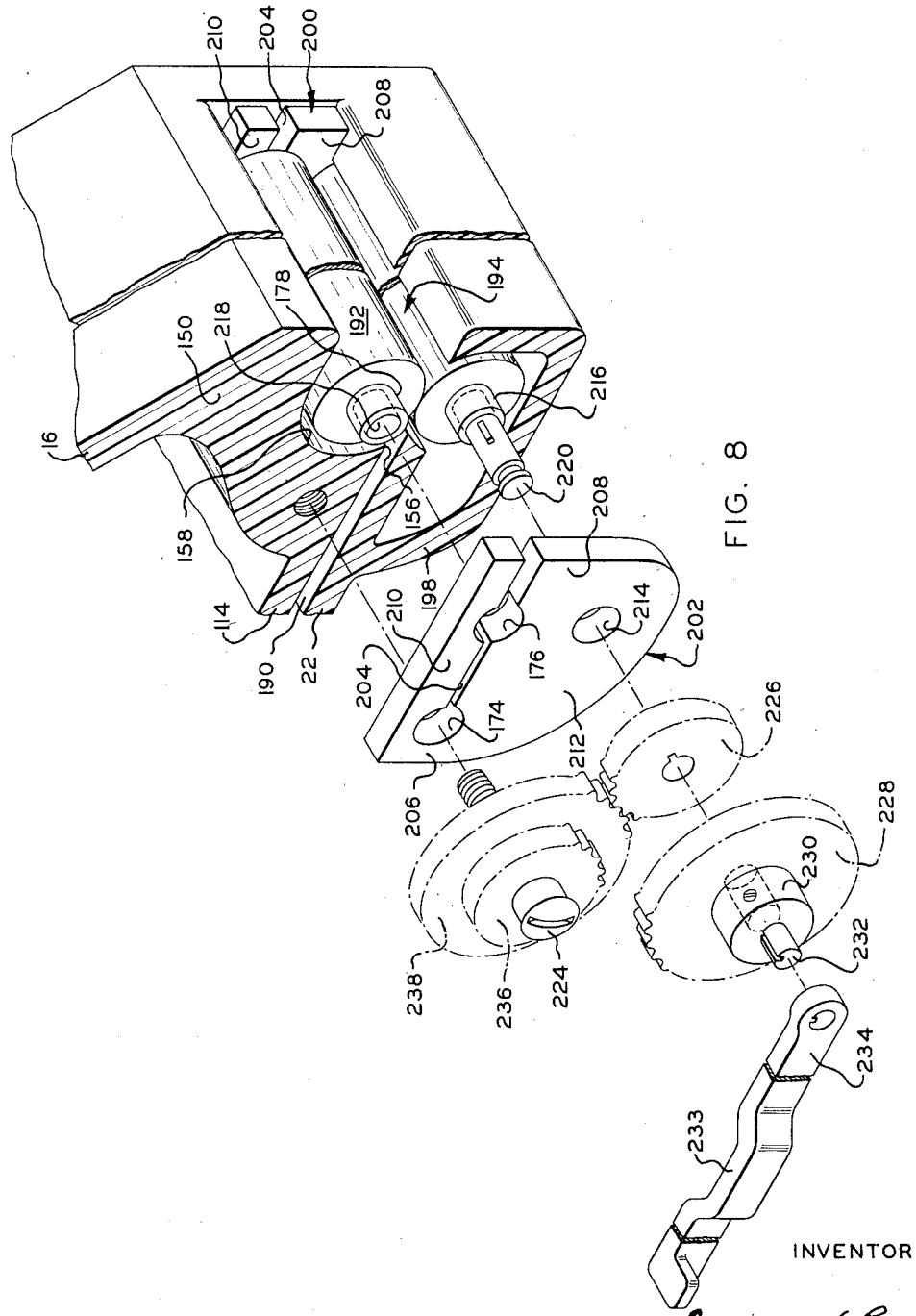
Fig. 8 is a perspective view of still another camera embodying the invention illustrated with parts broken away to show the spreading means.

Still another embodiment of the invention is illustrated in Fig. 8 wherein the spreading means includes a pair of pressure-applying rollers biased toward one another and between which the film unit is advanced for spreading the processing liquid on the photosensitive element during movement of the film unit into exposure position. This camera includes means for driving one of the rollers for advancing the film unit into and out of exposure position and means for separating the cover sheet from a film unit after the processing liquid has been spread during movement of said film unit into exposure position. The camera of Fig. 8 is substantially the same as that of Fig. 7, like numbers referring to like elements in the other figures, and includes a side wall 16 having a curved recessed portion 150 defining a recess 152. Recessed portion 150 of side wall 16 is of substantially greater thickness than the other sections of said wall and joins with intermediate wall 114 to define, in conjunction with rear wall 22, a passage 190 for guiding a film unit into exposure position. To strip the cover sheet from a film unit as it moves through passage 190, recessed portion 150 includes a wedge-shaped edge portion 156 defining the forward edge of passage 190, edge portion 156 being so positioned with respect to rear wall 22 as to extend into the path of the cover sheet between said sheet and the other elements of the film unit to separate the cover sheet therefrom. Curved recessed portion 150 includes a rounded exterior surface 158 for guiding the cover sheet out of the camera as said sheet is separated from the film unit.

The spreading means includes a pair of elongated pressure-applying rollers 192 and 194 mounted adjacent the end of passage 190 with their axes in parallel relation to one another and to rear wall 22. Rollers 192 and 194 extend substantially from side to side of passage 190, roller 192 being mounted forwardly of the passage in recess 152 and roller 194 being mounted at the rear of the passage in a portion of the housing formed by a generally rectangular, rearwardly extending, enlarged portion 198 of rear wall 22. Means are provided for mounting rollers 192 and 194 for pivotal movement and for resiliently urging said rollers toward one another, said mounting means comprising a pair of generally rectangular plates 200 and 202. Plates 202 and 200 are secured respectively in recesses in lower wall 18 and upper wall 20 at the end of passage 190 substantially perpendicular to rear wall 22. Each plate 200 and 202 is divided into two longitudinal portions 210 and 212 by a slot 204 extending from adjacent one end 206 of the plate to the other end 208 of the plate. Each of plates 200 and 202 includes a round opening or hole 174 at the end of slot 204 adjacent end 206 and a second hole 176 at said slot adjacent the other end 208 in which a bushing 178 may be secured for rotatably mounting roller 192. Longitudinal portion 212 of each plate 202 is substantially wider than portion 210 thereof and includes a hole 214 in which a bushing 216 is secured for pivotally mounting roller 194. Plates 200 and 202 are positioned in the camera with their longitudinal portions 210 forward, hole 214 being predeterminedly spaced toward the rear of the camera from hole 176 with the centers of holes 176 and 214 and the axes of rollers 192 and 194 lying in a plane substantially perpendicular to rear wall 22. Plates 200 and 202 and holes 176 and 214 therein are so positioned with respect to one another and the camera housing that the surface of roller 194 is substantially tangent to the plane of the inside surface of wall 22 defining the rear of passage 190, and a portion of roller 192 extends into the path of a film unit inserted into said passage, the space between rollers 192 and 194 normally being less than the thickness of a film unit. Plates 200 and 202, being resilient, permit longitudinal portions 210 thereof to be deflected when a film unit is inserted between rollers 192 and 194 while portion 210 acts as a cantilever spring, urging roller 192 toward roller 194 to exert pressure on a film unit as the latter moves between said rollers.

Pressure roller 192 includes a pair of stub shafts 218 extending from its ends at which said roller is pivotally mounted in bushings 178, and pressure roller 194 includes a single stub shaft 218 at one end journaled in bushing 216, secured in plate 200 and an elongated shaft 220 at its other end journaled in bushing 216 in plate 202. To secure plates 200 and 202 in place, there are provided means such as screws or bolts, one of which is indicated at 224, adapted to extend through the top and bottom walls of the camera housing through holes 174 in the plates and into enlarged recessed section 150 of side wall 16. Screw 224 is substantially longer than the other screw and includes a nonthreaded shank on which may be mounted elements of a drive mechanism for rotating pressure roller 194.

A manually operable drive mechanism is provided for rotating pressure roller 194 comprising a drive pinion 226, keyed or otherwise secured to shaft 220, and a substantially larger gear 228 freely mounted on shaft 220. Gear 228 includes a hub 230 to which is secured a shaft 232 extending exteriorly of the camera housing through an opening in upper wall 20. An elongated, manually engageable lever 234 is secured to shaft 232 for pivoting gear 228, said lever being illustrated with a curved portion 233 adapted to clear the head of bolt 224 extending through upper wall 20. A pinion gear 236 is mounted for free rotational movement on the unthreaded portion of bolt 224 with its teeth meshed with gear 228, and coupled with pinion 236 is a substantially larger gear 238 freely mounted on bolt 224 with its teeth meshed with drive pinion 226. By virtue of this arrangement of gears and pinions, an arcuate movement of lever 234 is transmitted, in turn, through gear 228, pinion 236, gear 238 and pinion 226 to roller 194, the relative numbers of teeth on each of the gears and pinions being such that roller 194 is rotated sufficiently to move a film unit into exposure position.

In this form of camera, the shutter may be actuated either as heretofore described by engagement of a lever by the film unit itself, or the shutter can be directly coupled with the drive mechanism. The film unit may be withdrawn from the camera housing by a manual operation of the pressure-applying rollers through the drive mechanism, or, in addition, the drive mechanism may include, for example, spring means for returning the mechanism to its initial position prior to movement of the film unit into exposure position, or means for moving the rollers apart when the film unit has been moved into exposure position, thereby permitting the operator to grasp the film unit and withdraw it manually from the camera following exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus adapted to make a single exposure upon the introductory movement of a photographic film unit into exposure position within said apparatus, said apparatus comprising, in combination, a housing defining a lighttight chamber, aperture means in a wall of said housing, shutter means associated with said aperture means, guide means within said chamber for locating said film unit in position for exposure, a passage, in said housing adjacent said guide means, communicating with the exterior of said housing and adapted to receive said film unit, and means responsive to introductory movement of said film unit through said passage into exposure position for actuating said shutter means when the latter is in exposure position, said shutter-actuating means comprising a lever operatively connected at one end with said shutter and so mounted within said camera housing that the other end of said lever extends into the path of movement of said film unit, the latter engaging said other end during movement into exposure position.

2. Photographic apparatus comprising, in combination, a housing defining a lighttight chamber, means providing an aperture in the forward wall of said housing, shutter means mounted on said wall in association with said aperture, guide means within said chamber at the rear thereof for locating a photographic film unit in position for exposure, said guide means comprising two walls between which said film unit is located during exposure, the forward of said two walls having an opening through which said film unit is exposed, a passage, in a wall of said housing, communicating with the exterior thereof and the space between said two guide walls adapted to receive said film unit, means rendering said passage lighttight as said film unit is moved therethrough, means associated with said passage for separating a light-shielding means from said film unit during introductory movement of said film unit through said passage into exposure position and for reapplying said light-shielding means to said film unit in a lighttight fashion during withdrawal of said film unit from said housing, and means responsive to introductory movement of said film unit into exposure position for actuating said shutter means when said film unit is in exposure position, the last-named means extending into the path of movement of said film unit.

3. A camera comprising, in combination, a housing defining a lighttight chamber, means providing an aperture in the forward wall of said housing, shutter means mounted on said wall in association with said aperture, guide means within said chamber for locating a photographic film unit in position for exposure, said guide means comprising two walls between which said film unit is located during exposure, the forward of said two walls having an opening through which said film unit is exposed, a passage, in a wall of said housing, communicating with the exterior thereof and the space between said two walls adapted to receive said film unit and permit its introduction into said housing, means rendering said passage lighttight as said film unit is moved therethrough, means associated with said passage for separating a light-shielding means from said film unit during introductory movement thereof into exposure position and for reapplying said light-shielding means to said film unit in a lighttight fashion during withdrawal of said film unit from said housing, and means within said housing responsive to the introductory movement of said film unit into exposure position for actuating said shutter means when said film unit is in exposure position, the last-named means extending into the path of movement of said film unit so as to engage the latter.

4. Photographic apparatus wherein the photosensitive element of a film unit is exposed and processed by a liquid composition releasably carried by said film unit, said apparatus comprising, in combination, a housing defining a lighttight chamber, exposure means associated with said housing, guide means within said chamber for locating said film unit with said photosensitive element in position for exposure, a passage, in said housing adjacent said guide means and communicating with the exterior of said housing, said passage being adapted to receive said film unit, means associated with said housing for distributing said liquid composition within said film unit as the latter is introduced into said housing through said passage, and means responsive to introductory movement of said film unit into exposure position for actuating said exposure means when said photosensitive element is in exposure position.

5. Photographic apparatus wherein the photosensitive element of a film unit is exposed and processed by a liquid composition releasably carried by said film unit, said apparatus comprising, in combination, housing means defining a lighttight chamber, aperture means in said housing, shutter means associated with said aperture means, guide means within said chamber for locating said film unit with said photosensitive element in position for exposure, a passage, in said housing adjacent said guide means, communicating with the exterior of said housing and being adapted to receive said film unit, means mounted on said housing for effecting the layerwise distribution of said liquid composition within said film unit as the latter is introduced into said chamber through said passage and moved into exposure position, and means within said chamber responsive to the movement of said film unit for actuating said shutter means when said photosensitive element is in exposure position.

6. Photographic apparatus wherein a liquid processing composition releasably carried by a film unit is distributed upon the photosensitive element of the film unit and said photosensitive element is exposed immediately thereafter, said apparatus comprising, in combination, a housing defining a lighttight chamber, aperture means, shutter means associated with said aperture means, guide members within said chamber for locating said film unit with said photosensitive element in position for exposure, a passage, in said housing adjacent said guide members, communicating with the exterior of said housing and adapted to receive said film unit, means mounted within said housing and extending into the path of said film unit in position to engage said film unit during introductory movement of the latter through said passage into exposure position and apply pressure to said film unit so as to effect the release of the liquid processing composition carried by said unit and the distribution of said liquid processing composition within said unit, and actuating means within said chamber responsive to the introductory movement of said film unit into exposure position for actuating said shutter means when said photosensitive element is in exposure position.

7. Photographic apparatus wherein a liquid processing composition releasably carried by a film unit is distributed upon the photosensitive element of the film unit and said photosensitive element is exposed immediately thereafter, said apparatus comprising, in combination, a housing defining a lighttight chamber, exposure means associated with said housing, guide means within said chamber for locating said film unit with said photosensitive element in position for exposure, a passage, in said housing adjacent said guide means, communicating with the exterior of said housing and adapted to receive said film unit, means mounted within said passage for engaging said film unit and applying pressure thereto so as to effect the release of said liquid processing composition carried by said unit and the layerwise distribution of said liquid processing composition between said photosensitive element and another element comprising said film unit during introductory movement of the latter through said passage into exposure position, and means within said chamber responsive to the introductory movement of said film unit for actuating said exposure means when said photosensitive element is in exposure position.

8. The photographic apparatus of claim 7 wherein said pressure-applying means comprises a resilient element, substantially as wide as the area of said photosensitive element to be exposed, mounted within said housing and having a straight portion at which it is mounted and a curved portion extending into the path of movement of said film unit through said passage, said film unit being compressed between said curved portion of said element and a wall of said passage as it moves therebetween.

9. The photographic apparatus of claim 7 wherein said pressure-applying means comprises a pair of elongated rollers mounted within said passage and extending from side to side thereof, the axes of said rollers lying in a plane substantially perpendicular to the plane of said film unit as the latter moves through said passage between said rollers into exposure position, and resilient means urging said rollers toward one another.

10. A camera wherein a liquid processing composition releasably carried by a film unit is distributed upon the photosensitive element of the film unit and said photosensitive element is exposed immediately thereafter, said camera comprising, in combination, a housing defining a lighttight chamber, a front wall, exposure means associated with said front wall, a rear wall, guide means within said chamber at the rear of said housing for locating said film unit with the photosensitive element thereof in position for exposure, said guide means comprising two walls between which said film unit is positioned, the forward of said two walls having an aperture through which said photosensitive element is exposed, an aperture in a wall of said housing adjacent said guide walls communicating with the exterior of said housing and adapted to receive said film unit, pressure-applying means so constructed and mounted within said passage for applying pressure to said film unit to effect the release of said liquid processing composition carried by said film unit and the layerwise distribution of said liquid processing composition within said film unit during introductory movement of the latter through said passage into exposure position, and means within said chamber responsive to the introductory movement of said film unit for actuating said exposure means when said photosensitive element is in exposure position.

11. The camera of claim 10 wherein said pressure-applying means comprises a resilient member mounted on said rear wall, said resilient member being substantially as wide as said aperture through which said photosensitive element is exposed and having a curved portion extending into the path of movement of said film unit between said guide walls, said member being adapted to compress said film unit as the latter moves between said member and the forward of said two guide walls.

12. The camera of claim 10 wherein said pressure-applying means includes an elongated resilient element extending substantially from side to side of said aperture through which said film unit is introduced into said camera, said element having a relatively flat portion at which it is secured to said rear wall adjacent said aperture and a curved portion extending through an opening in the rear of said guide walls into the passage between said guide walls, said curved portion being spaced from said forward guide wall by a distance less than the minimum thickness of said film unit and, in this position, being capable of engaging and compressing said film unit as the latter moves between said guide walls.

13. Photographic apparatus wherein a liquid processing composition releasably carried by a film unit is distributed upon the photosensitive element of the film unit and said photosensitive element is exposed immediately thereafter, said apparatus comprising, in combination, a housing defining a lighttight chamber, exposure means associated with said housing, time delay means adapted to actuate said exposure means at a predetermined interval following actuation of said time delay means, guide means within said chamber for positioning said film unit with said photosensitive element in position for exposure, a passage, in said housing adjacent said guide means, communicating with the exterior of said housing and adapted to receive said film unit, means mounted within said housing for applying pressure to said film unit to effect the release of said liquid processing composition carried by said film unit and the distribution of said liquid processing composition within said film unit as the latter is introduced into said chamber through said passage, and means responsive to the introductory movement of said film unit for actuating said time delay means so that the latter actuates said exposure means when said photosensitive element is in exposure position.

14. A camera wherein a liquid processing composition releasably carried by a film unit is distributed upon the photosensitive element of the film unit and said photosensitive element is exposed immediately thereafter, said camera comprising, in combination, a housing defining a lighttight chamber, aperture means, shutter means associated with said aperture means, time delay means adapted to actuate said shutter means at a predetermined interval following actuation of said time delay means, guide means within said chamber for positioning said film unit with said photosensitive element in position for exposure, a passage, in said housing adjacent said guide means, communicating with said housing and adapted to receive said film unit, means mounted within said housing for applying pressure to said film unit to effect the release of said liquid processing composition and the distribution of said liquid processing composition within said film unit during introductory movement of the latter through said passage, and means within said chamber responsive to the introductory movement of said film unit into exposure position for actuating said time delay means during said movement, said time delay means actuating said shutter means almost immediately as said photosensitive element comes to rest in exposure position.

15. Photographic apparatus for use with a film unit including a photosensitive element and a light-shielding element, said apparatus comprising, in combination, a housing defining a lighttight chamber, means providing an aperture in a wall of said housing, exposure means mounted on said wall in association with said aperture, guide means within said chamber for positioning a film unit for exposure in a predetermined plane and for permitting sliding movement of said film unit substantially in said plane into and from exposure position, said guide means comprising two guide walls located on the side of said chamber opposite the first-mentioned wall and spaced apart from and generally parallel with one another to permit the movement of said film unit in said plane therebetween, one of said guide walls closest said exposure means having an opening through which said film unit is exposed, a passage in said housing adjacent said guide means and communicating with the exterior of said housing and the space between said guide walls for admitting said film unit substantially in said plane, means within said passage for engaging said film unit and rendering said passage lighttight as said film unit is moved therethrough, stripping means mounted within said passage between said guide walls so as to project between the photosensitive and light-shielding elements of said film unit for separating said light-shielding element from said film unit as the latter is moved against said stripping means during introductory movement through said passage into exposure position, and engagement means mounted for movement within said chamber between said guide walls whereby said engagement means is engaged and moved by said film unit during movement of said film unit between said guide walls into exposure position, said engagement means being coupled with said exposure means for actuating said exposure means when said film unit is in exposure position.

16. Photographic apparatus for exposing the photosensitive element of a photographic film unit and for use as a viewer for a photographic transparency, said apparatus comprising, in combination, a housing defining a lighttight chamber, photographic lens and shutter means mounted on one side of said chamber, guide means within said chamber at the opposite side thereof for positioning a film unit for exposure in a predetermined plane and for permitting sliding movement of said film unit substantially in said plane into exposure position, said guide means being adapted for positioning a photographic transparency in the same position, a passage in said housing adjacent said guide means communicating with the exterior of said housing for admitting one of said film unit and said transparency in said plane, engagement means mounted for movement in the path of sliding movement of said film unit through said passage into exposure position whereby said engagement means is moved by said film unit and said transparency into exposure position to actuate said shutter means when one of said film unit and said transparency is in exposure position, aperture means in a wall of said housing opposite said shutter means and adjacent said guide means through which light may be transmitted for illuminating said transparency located in exposure position, light-diffusing means mounted in the last-mentioned aperture, and lighttight closure means for said last-mentioned aperture.

17. Photographic apparatus comprising, in combination, a housing defining a lighttight chamber, exposure means associated with said housing, time delay means for actuating said exposure means at a predetermined interval following actuation of said delay means, guide means within said chamber for positioning a film unit for exposure in a predetermined plane and for permitting sliding movement of said film unit substantially in said plane into exposure position, a passage in said housing adjacent said guide means communicating with the exterior of said housing for admitting said film unit substantially in said plane, and engagement means mounted for movement in the path of sliding movement of said film unit through said passage into exposure position whereby said engagement means is moved by engagement with said film unit for actuating said time delay means during movement of said film unit into exposure position and said time delay means is rendered operative to actuate said exposure means when said film unit has come to rest in exposure position.

18. The photographic apparatus of claim 17 wherein said exposure means comprises a camera shutter and said time delay means is operative to actuate said shutter for making an exposure.

19. Photographic apparatus adapted to make a single exposure upon the introductory movement of a photographic film unit into exposure position within said apparatus, said apparatus comprising, in combination, a housing defining a lighttight chamber, aperture means in a wall of said housing, shutter means associated with said aperture means, guide means within said chamber for locating said film unit in position for exposure, a passage, in said housing adjacent said guide means, communicating with the exterior of said housing and adapted to receive said film unit, and means responsive to introductory movement of said film unit through said passage into exposure position for actuating said shutter means when the latter is in exposure position, said shutter-actuating means comprising lever means operatively connected with said shutter and so mounted within said camera housing that a portion of said lever means extends into the path of movement of said film unit, the latter engaging said portion during movement into exposure position.

References Cited in the file of this patent

UNITED STATES PATENTS

| | | |
|---|---|---|
| 1,361,031 | Eberman | Dec. 7, 1920 |
| 1,953,556 | Gitzhoven | Apr. 3, 1934 |
| 2,360,871 | Griswold | Oct. 24, 1944 |
| 2,447,468 | Reyniers | Aug. 17, 1948 |